United States Patent [19]

Erkki

[11] Patent Number: 5,174,585

[45] Date of Patent: Dec. 29, 1992

[54] ADJUSTABLE FASTENING DEVICE

[75] Inventor: Rinne Erkki, Espoo, Finland

[73] Assignee: Unicraft Oy, Helsinki, Finland

[21] Appl. No.: 592,270

[22] Filed: Oct. 3, 1990

[30] Foreign Application Priority Data

Oct. 3, 1989 [FI] Finland .................. 894671

[51] Int. Cl.$^5$ ............................................. B23B 31/30
[52] U.S. Cl. .................... 279/2.08; 279/2.07;
279/2.09; 279/4.03; 279/4.06; 403/269
[58] Field of Search ............... 279/4, 1 Q, 46.8, 4.07,
279/4.08, 4.09, 102, 103, 4.06, 2.06–2.09, 2.17,
2.22, 4.03; 82/164; 403/31, 40, 269

[56] References Cited

U.S. PATENT DOCUMENTS

| | | |
|---|---|---|
| 2,324,225 | 7/1943 | Mueller . |
| 2,553,990 | 5/1951 | Vidal .................. 279/4.06 X |
| 2,652,749 | 9/1953 | Hagmeister . |
| 2,794,661 | 7/1954 | Sears . |
| 2,826,420 | 3/1958 | Klingler . |
| 2,852,287 | 9/1958 | Baker . |
| 2,911,222 | 11/1959 | Eve . |
| 3,259,020 | 7/1966 | Walker . |
| 3,497,226 | 2/1970 | Hohwart . |
| 4,430,017 | 2/1984 | Stefancich . |

FOREIGN PATENT DOCUMENTS

| | | |
|---|---|---|
| 824726 | 11/1951 | Fed. Rep. of Germany . |
| 1170607 | 5/1964 | Fed. Rep. of Germany . |
| 1246359 | 8/1967 | Fed. Rep. of Germany . |
| 1400226 | 11/1968 | Fed. Rep. of Germany . |
| 2632526 | 1/1978 | Fed. Rep. of Germany . |
| 3207921 | 11/1982 | Fed. Rep. of Germany . |
| 206634 | 2/1984 | Fed. Rep. of Germany .......... 279/4 |
| 3318288 | 11/1984 | Fed. Rep. of Germany . |
| 3321505 | 12/1984 | Fed. Rep. of Germany . |
| 73784 | 7/1953 | Netherlands . |
| 7211769-0 | 9/1971 | Sweden . |
| 511104 | 9/1971 | Switzerland . |
| 538057 | 7/1973 | Switzerland . |
| 1271671 | 11/1986 | U.S.S.R. .................. 279/4 |
| 1313580 | 5/1987 | U.S.S.R. .................. 279/4 |
| 1473906 | 4/1989 | U.S.S.R. .................. 279/4 |
| 1540952 | 2/1990 | U.S.S.R. .................. 279/1 Q |
| 2007550 | 5/1979 | United Kingdom . |

OTHER PUBLICATIONS

Erfindung- und Vorschlagswesen, "Hydroplast-Schleifdorn", vol. 13, No. 5, May 1964, p. 225, by Stanki i Instrument.

Primary Examiner—Steven C. Bishop
Attorney, Agent, or Firm—Christie, Parker & Hale

[57] ABSTRACT

The invention relates to an adjustable fastening device e.g. for an axially-shaped, tubular, flat or spherical tool or working piece or machine part or a like of a desired shape. The device includes: a body section (1), a clamping means (2), mounted within the body section (1) and at least partly pressable/squeezable indirectly or directly against a piece (10) to be fastened. Between the body section (1) and the clamping is provided a space (3), which is pregreased for a medium effecting said pressing/squeezing. The medium comprises in situ cast elastomer (5) whereby, upon the application of pressure on elastomer by means of a screw, a piston or the like, said elastomer (5) delivers by way of its displacement and/or deformation said pressure to clamping means (2) which thus presses/squeezes against a piece (10) to be fastened and, upon releasing said pressure, the elastomer (5) returns to its initial state.

21 Claims, 14 Drawing Sheets

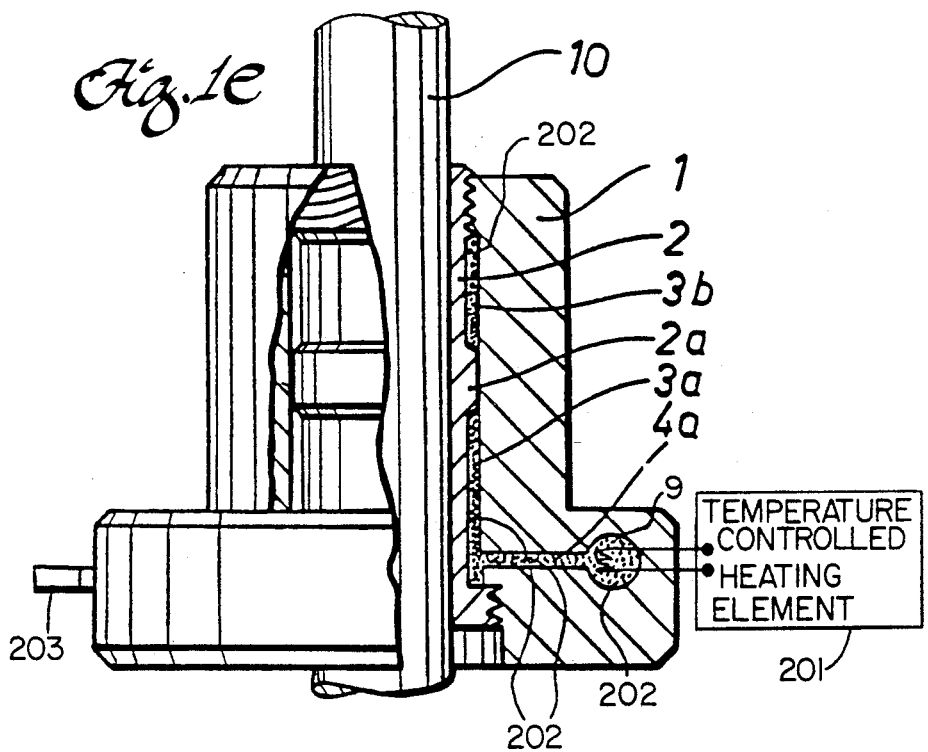
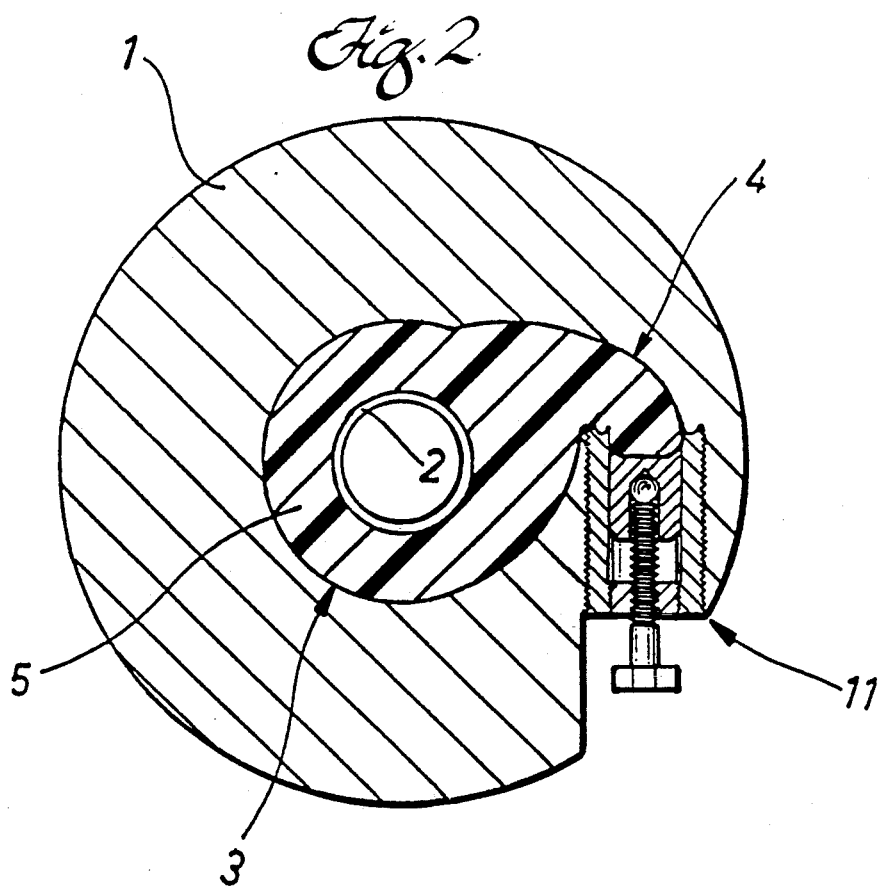

ADJUSTABLE FASTENING DEVICE

FIELD OF THE INVENTION

The present invention relates to an adjustable fastening device suitable for fastening various shaped tools or working pieces or various machine elements or the like.

BACKGROUND OF THE INVENTION

Patent publications DE 1929659 and DE 2644576 as well as the public application DE 2700934 disclose fastening means for axial bodies based on a pressure created by hydraulic pressure for reducing a fastening sleeve. However, these fastening means involve a problem of oil leaks caused by wear or failure of the seals.

SUMMARY OF THE INVENTION

An object of the present invention is to provide an adjustable fastening device whereby the above problem of oil leaks can be eliminated and which device is also suitable for high pressures, e.g. appr. 1000 bars or more. In order to achieve this object, a device of the invention is characterized in that the pressure medium comprises elastomer, e.g. a two-component silicone, which is cast in situ in a pressure medium space and/or passage having its walls pre-treated with a release agent which prevents elastomer from sticking to the walls and allows the movement of elastomer in said space and/or passage, the elastomer serving as a hydraulic-fluid replacing pressure medium whereby, upon the application of pressure on elastomer by means of a piston or a screw or the like, said elastomer by way of its movement and/or deformation delivers said pressure (directly or indirectly) to a clamping means which thus presses/squeezes against a piece to be fastened or against a spacer block which in turn presses/squeezes against a piece to be fastened and, upon releasing said pressure, the elastomer resumes its initial state automatically and/or by means of a separate spring element and/or by means of a second clamping means acting in opposite direction. Alternatively, a device of the invention is characterized in that the pressure medium comprises a pre-set elastomer which is pressed as pieces/crumbs/powder in a pressure medium space and/or passage whereby the elastomer does not at least substantially stick to the walls allowing, upon the application of pressure on elastomer by means of a piston, a screw or the like, said elastomer to deliver by way of its movement and/or deformation said pressure (directly or indirectly) to a clamping means which thus presses/squeezes against a piece to be fastened or against a spacer block which in turn presses/squeezes against a piece to be fastened and, upon releasing said pressure, the elastomer resumes its initial state automatically and/or by means of a separate spring element and/or by means of a second clamping means acting in opposite direction. An essential feature in terms of the operability of the invention is the displacement of elastomer relative to a pressure medium space and/or passages the same way as a hydraulic fluid.

The most important advantage offered by a device of the invention is that by replacing a hydraulic oil with elastomer, e.g. a two-component silicone rubber (such as e.g. silicone rubber RTV-2, shore hardness appr. 18 . . . 70, manufactured by Wacker-Chemie GmbH, Federal Republic of Germany), it is possible to overcome the leaking problems and, in addition, the manufacturing tolerances required of such a device can be considerably less stringent than those required when using hydraulic oil. For example, when the gap between the parts is in the order of 0,1-0,2 mm, silicone is retained within the structure even up to the pressure of over 700 bars while oil leaks through a considerably smaller gap and at a substantially lower pressure. Thus, the use of oil requires different, generally complicated sealing structures. When using elastomer, the seals can be considerably more simple and, if necessary, can be completely eliminated. Furthermore, when using pre-set elastomer cast in situ and/or pressed as pieces/powder, there is no need for manufacturing separate moulds independently for each application and the installation step is eliminated. The in situ casting is preferably effected by means of a two-component casting machine having a variable mixing ratio. Most preferably, the elastomer used is selected from condensation hardener based silicone elastomers which set at room temperature. The shaping of an elastomer space for in situ cast or pressed elastomer is also less restrictive than what could be achieved by using ready-made elastomer structures. Another advantage offered by silicone is that, especially as pre-set pieces/powder, it does not readily stick to metal surfaces and it is capable of deforming by the application of a minor force, behaving the same way as a liquid in the sense that it cannot be permanently compressed. The in situ cast elastomer can be kept substantially out of adherence to the walls by using some appropriate release agent, e.g. various lubricants, waxes or powders which are compatible with any given elastomer. Thus, the elastomer can also be placed e.g. in existing hydraulic fluid passages to replace a hydraulic fluid therein, whereby the passages can be very small indeed. As for silicone, for example, the conventional soap and silicone grease have proved to be suitable release agents. During the operation, this type of release agent may gradually work its way out of the elastomer space and/or passages. However, the effect of such ejection of a release agent upon the adherence of elastomer to the walls remains practically negligible due to the fact that the reciprocating movement of elastomer relative to the walls causes a gradual crumbling of elastomer at least as far as the surface layer is concerned, the crumbled layer forming a release layer which prevents elastomer from sticking to the walls. The dimensioning of silicone passages differs from that of fluid passages in the sense that, as far as silicone is concerned, it is necessary to consider the effect of shore hardness on the distribution of pressure in silicone. In principle, the distribution of force is similar to what it is in a liquid minus the force required by the internal deformation of elastomer.

In view of the operation of the device it is preferred that the working head of a piston or a screw coming against the elastomer layer of a pressurizing medium be provided with a lip portion at its edge for preventing the elastomer from working its way in between said piston/screw and a cylinder member in which the piston is operating. The lip portion can be preferably formed by providing the piston head with a sealing layer made or Teflon, graphite, or a similar material, said lip portion being formed in that sealing.

The preliminary tests were performed by using a piston having a diameter of 8 mm, a stroke of 10 mm, a stroke frequency of 2 times a second, and an operating pressure of 400-800 bars, the elastomer being squeezed into a passage having a diameter of circa 2 mm leading to a previously oil-operated axle coupling. This resulted in a leakproof structure which in a test apparatus still remained leakproof and operational after 250,000 strokes. (FIG. 1d).

The pressurizing medium can also be provided by using a heating element, e.g. an electric resistance, which upon heating results in the expansion of elastomer and, thus, the increase of pressure. In order to regulate the pressure, the heating element is further provided with a set screw or a piston which can be mounted directly on the heating element or detached therefrom.

BRIEF DESCRIPTION OF THE DRAWINGS

The invention will now be described with reference made to the accompanying drawings, in which:

FIGS. 1a-1e illustrate a few embodiments for a fastening device of the invention intended for clamping axially-shaped pieces, FIG. 2 shows a cross-section of the fastening device of FIG. 1a along a line 2—2 in FIG. 1a, FIGS. 3a-3d illustrate a few embodiments for a pressurizing means for use in a fastening device of the invention.

DETAILED DESCRIPTION OF THE PREFERRED EMBODIMENT

Figure 1A:
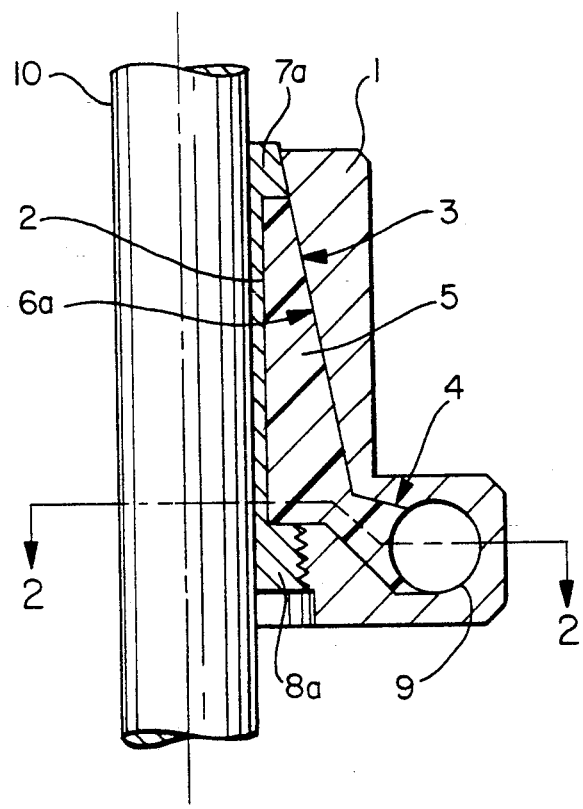

A fastening device shown in FIG. 1a is intended for the internal clamping of axial or tubular pieces 10. The fastening device comprises a body section 1, inside which is fixed a clamping sleeve 2 which is preferably substantially cylindrical in shape. The body section 1 has an inner surface 6a shaped as a circular cone for building between inner surface 6a and clamping sleeve 2 a space 3 which is substantially triangular in axial section and intended for elastomer 5 to be cast in situ. Such a triangular space is preferred, since thus a pressure applied on elastomer is distributed more uniformly on the fastened piece over its entire length. A portion between the ends 7a, 8a, and respectively 7b, 8b, of clamping sleeve 2 is made substantially thinner than the end portion for allowing the sleeve to press over said portion against a piece to be fastened. The body section 1 is further provided with a compression chamber 4 connected with elastomer space 3, a throttle portion being provided between compression chamber 4 and elastomer space 3. The compression chamber 4 is provided with a pressure medium 11 (FIG. 2) which is preferably set in a threaded hole 9 made in body section 1.

Figure 3A:
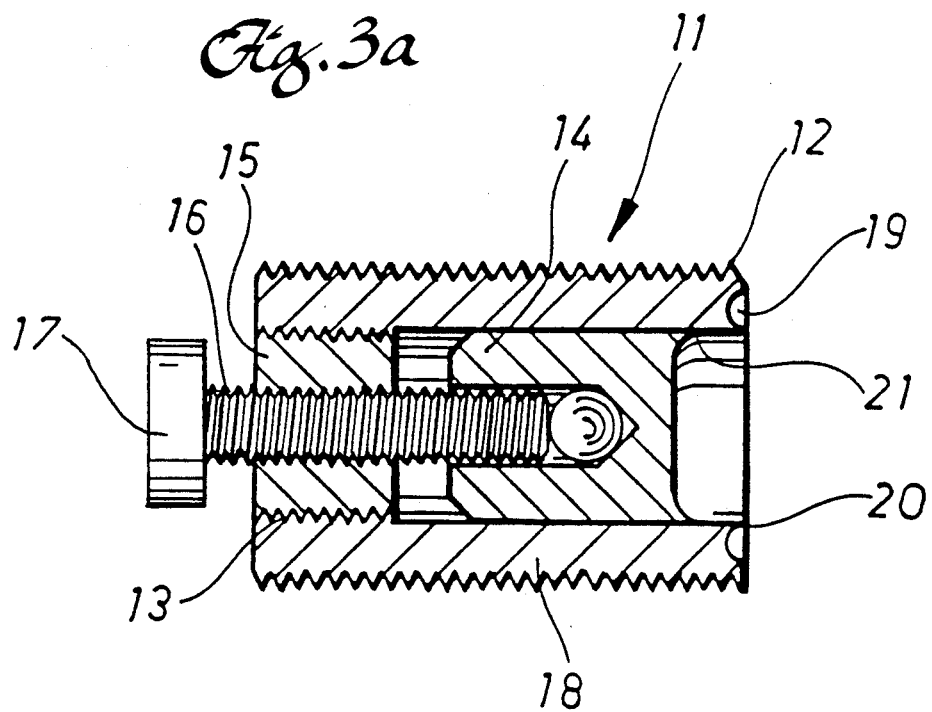

In the embodiment shown in FIG. 3a, the pressure medium 11 is provided by an outer piston member 18, which is to be connected in threaded hole 9 and inside which is fitted an inner piston 14. The inner piston 14 is operated e.g. by means of a screw member 16, which screw member is connected through a spacer block 15 by means of a thread 13 to outer piston 18. The screw member 16 is further provided with a driving head 17. The inner piston can also be operated e.g. by means of an eccentric or some other per se known mechanical device. The outer piston member 18 is used for fixing a pressure medium 11 to body section 1 and it serves also as an initial pressure adapter. The inner piston 14 effects the actual pressurization required for fastening. The frontal surface of outer piston 18 facing elastomer space 4 is preferably provided with a groove 19 for producing in the internal edge of outer piston 18 a lip portion 20 for preventing the elastomer from entering between the inner piston 14 and the internal surface of outer piston 18 with said inner piston 14 extending beyond the frontal surface of outer piston 18 facing said compression chamber 4. The inner piston 14 is provided with a corresponding lip portion 21 for preventing the elastomer from entering between inner and outer piston when piston 14 is inside said outer piston 18. The end of inner piston 14 facing elastomer 5 can be made e.g. wedge-shaped for a more uniform distribution of the pressure exerted on elastomer.

Figure 3B:
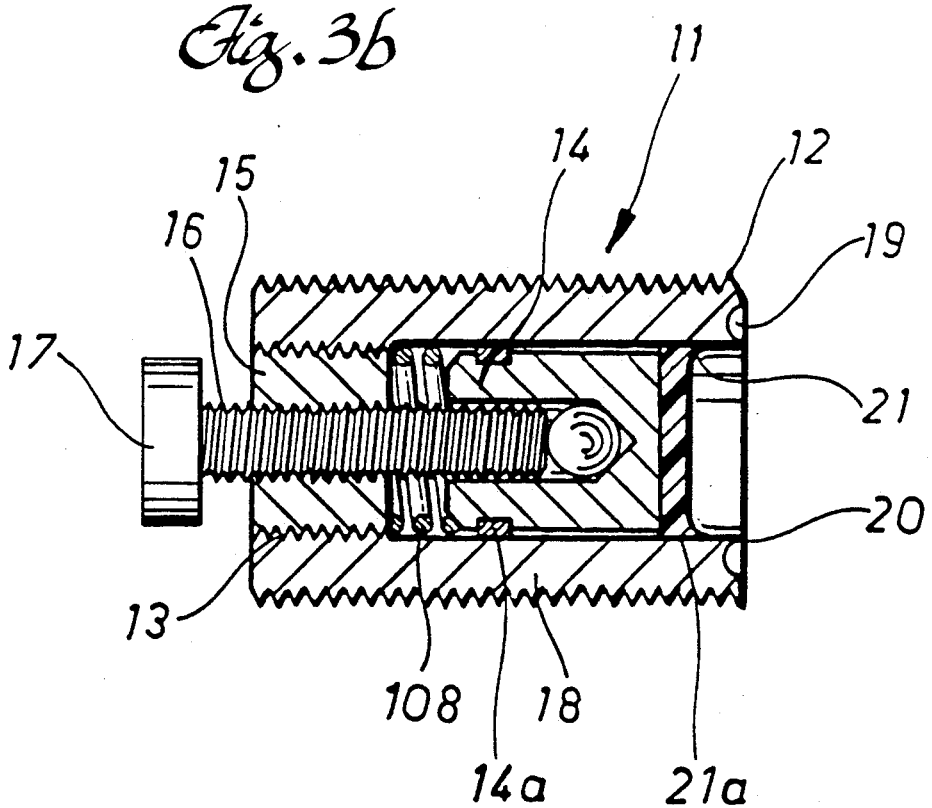

FIG. 3b illustrates a pressure medium as shown in FIG. 3a but provided with a spring 108 which compensates for the volume variations of elastomer caused by temperature variations. In addition, piston 14 is provided with sealing members 14a and 21a. The sealing member 21a is provided with a lip portion 21. The material for sealing members 14a and 21a preferably comprises carbon fiber-reinforced Teflon. The purpose of such sealing members is primarily to build bearing surfaces for moving piston 14 thereupon so as to reduce the cylinder wear. Furthermore, said lip portion 21 prevents elastomer from working its way in between piston 14 and the cylinder walls.

Figure 3C:
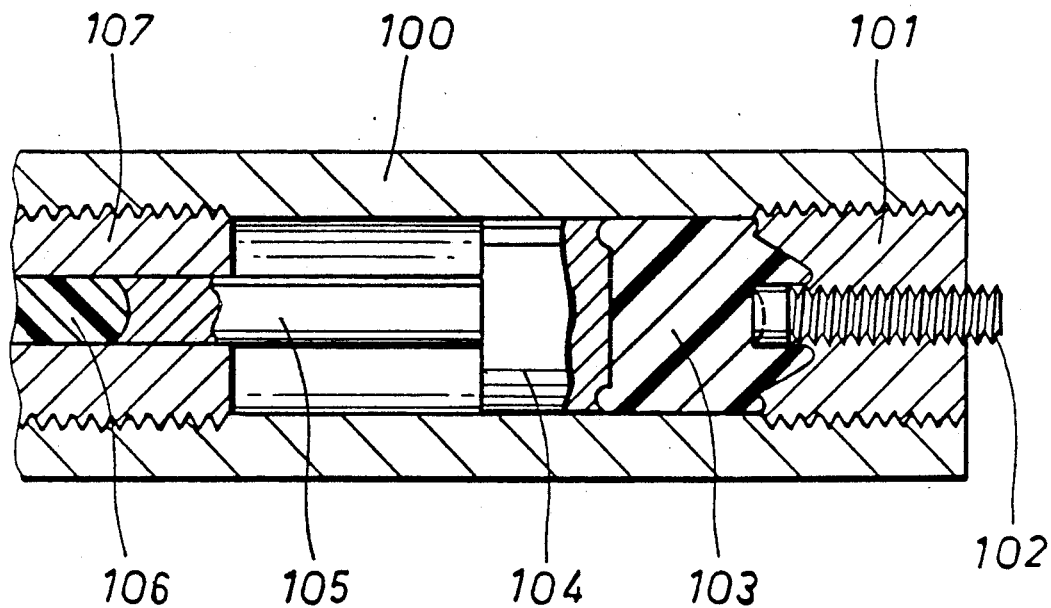

FIG. 3c illustrates an embodiment, wherein a plurality of pistons of various sizes are successively linked to each other. To a body section 100 is fixed e.g. with a screw joint a spacer block 101 which is fitted with a first piston or pin 102. The first piston acts on a first elastomer layer 103 which transmits the pressure to a second piston 104 which has a surface area substantially larger than that of said first piston 102. The surface of second piston 104 facing away from said first elastomer layer 103 is provided with a third piston 105 which has a surface area substantially smaller than that of second piston 104. The third piston 105 creates in a second elastomer layer 106 inside an inner tube 107 an increased pressure, whereby said piston combination serves as a pressure booster. The magnitude of such boost depends on the ratio of the surface areas of the pistons. Another elastomer space 106 can be connected e.g. with one or a plurality of elastomer spaces 3 shown in FIGS. 1a-1c. A piston combination as shown in FIG. 3c is also suitable e.g. for the precise setting of various machine components and e.g. for producing a feeding movement for the guide tables, circular tables etc. of machine tools.

Figure 3D:
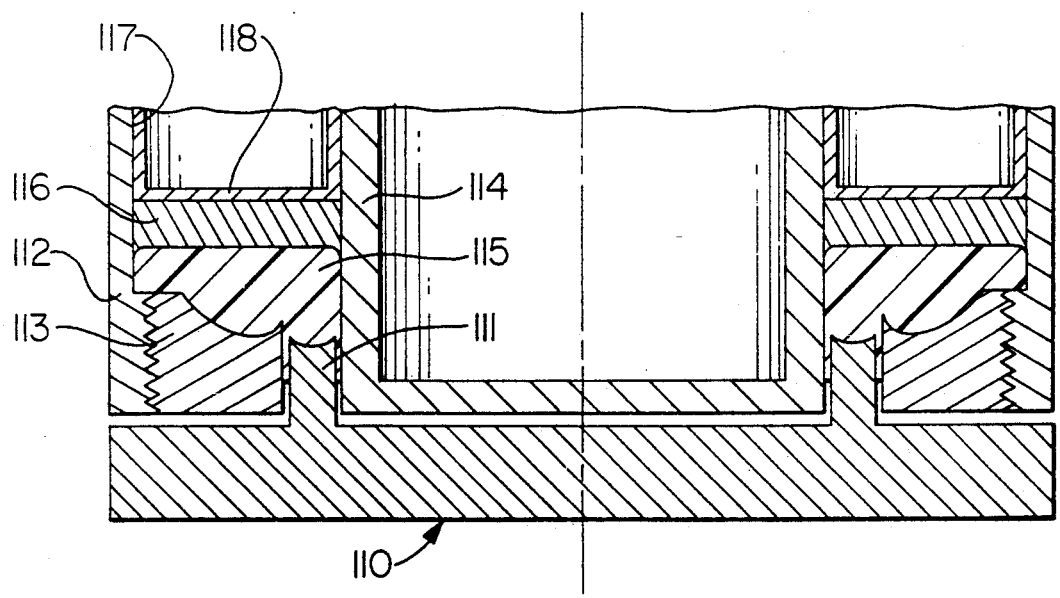

FIG. 3d illustrates a cylindrical pressure medium 110 provided with a continuous annular piston member 111. The piston member 111 can also be designed to comprise several components, e.g. separate pistons, spaced from each other in a circular pattern. A pressure medium 110 is mounted at the end of an inner tube 114 and an outer tube 112 with a spacer block 113 being used for providing a space for annular piston 111. Said space communicates with an elastomer space, which is formed between inner and outer tubes and in which elastomer 115 is cast in situ. The end of said elastomer space facing away from pressure medium 110 is provided with a second annular piston 116. When applying to pressure medium 110 an axially directed force, the annular piston 111 works its way into elastomer layer 115 which, in turn, by way of its deformation, delivers the presssure to second annular piston 116. Thus, the annular piston 116 compresses against a frontal surface 118 of a tube 117 to be fastened. This fastening is suitable e.g. for coupling joints, said piston 116 and/or surface 118 being preferably provided with a friction surface.

Figure 1B:
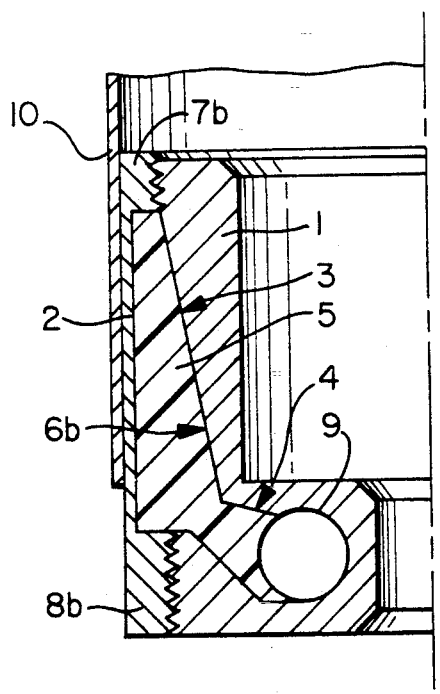
Figure 1C:
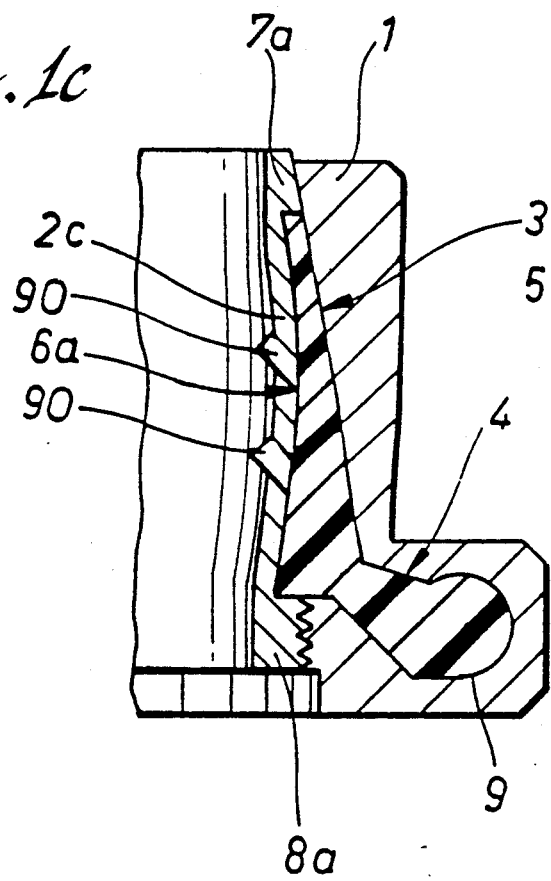

FIG. 1b illustrates the use of a fastening device of the invention for the internal clamping of tubular pieces 10. The device shown in FIG. 1b differs from that of FIG. 1a principally in the sense that the clamping sleeve 2 is mounted on the external surface of body section 1. In the embodiment shown in FIG. 1b, both ends 7b and 8b of clamping sleeve 2 are further fitted with a threaded portion for attaching the sleeve to body section 1, while in the embodiment of FIG. 1a, the end further away from compression chamber 4, i.e. the distal end 7a, is made conical corresponding essentially to the conicity of internal wall 6a, the inner end 8a being provided with a threaded portion. The embodiment shown in FIG. 1c corresponds substantially to that of FIG. 1a, the only difference being that the sleeve member 2 is made over its section between ends 7a, 8a convex so as to face elastomer layer 5, whereby the sleeve member 2 serves as a spring means facilitating the return of elastomer to its initial condition as the action of external pressure ceases. In addition, the inner surface of sleeve member 2 is preferably provided with gripping means 90 facilitating the clamping action onto a shaft or a pipe. Gripping means 90 can be designed e.g. as sharp-edged projections or the like. These sharp-edged projections can then be used e.g. for providing a knurling on the surface of a shaft to be fastened. The device shown in FIG. 1c is further suitable e.g. for fastening spherical pieces. Naturally, such projections can just as well be provided on the embodiments shown in FIGS. 1a and 1b.

Figure 1D:
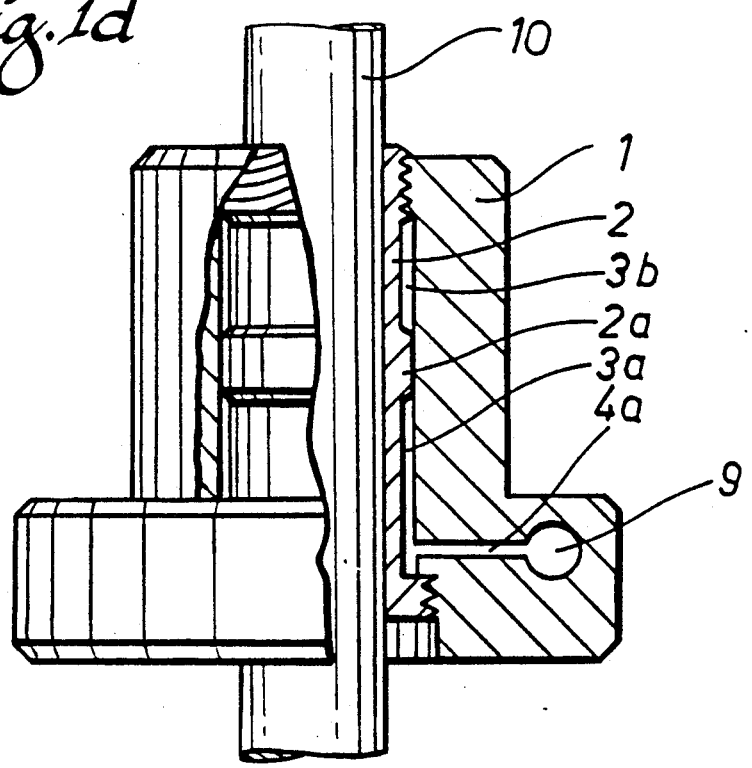

The embodiment shown in FIG. 1d is a modification of that shown in FIG. 1a. Here, the elastomer space comprises two sections 3a and 3b which are separated by a separating web 2a, formed in the elastomer-space facing surface of sleeve member 2 and provided with openings for bringing elastomer spaces 3a and 3b into communication with each other. In their longitudinal direction, said elastomer spaces 3a and 3b are designed to remain constant in cross-section. This type of device shown in FIG. 1d was employed in the test mentioned in the introduction, wherein the structure retained its leakproof design and operating capability even after 250 000 strokes.

In FIG. 1e, which is a variation of FIG. 1d in which like reference numerals represent like elements, the pressure-creating member is a temperature-controlled heating element 201, and the elastic pressure medium is in the form of particles 202. In addition, a set screw 203 is provided to equalize pressure.

Figure 4:
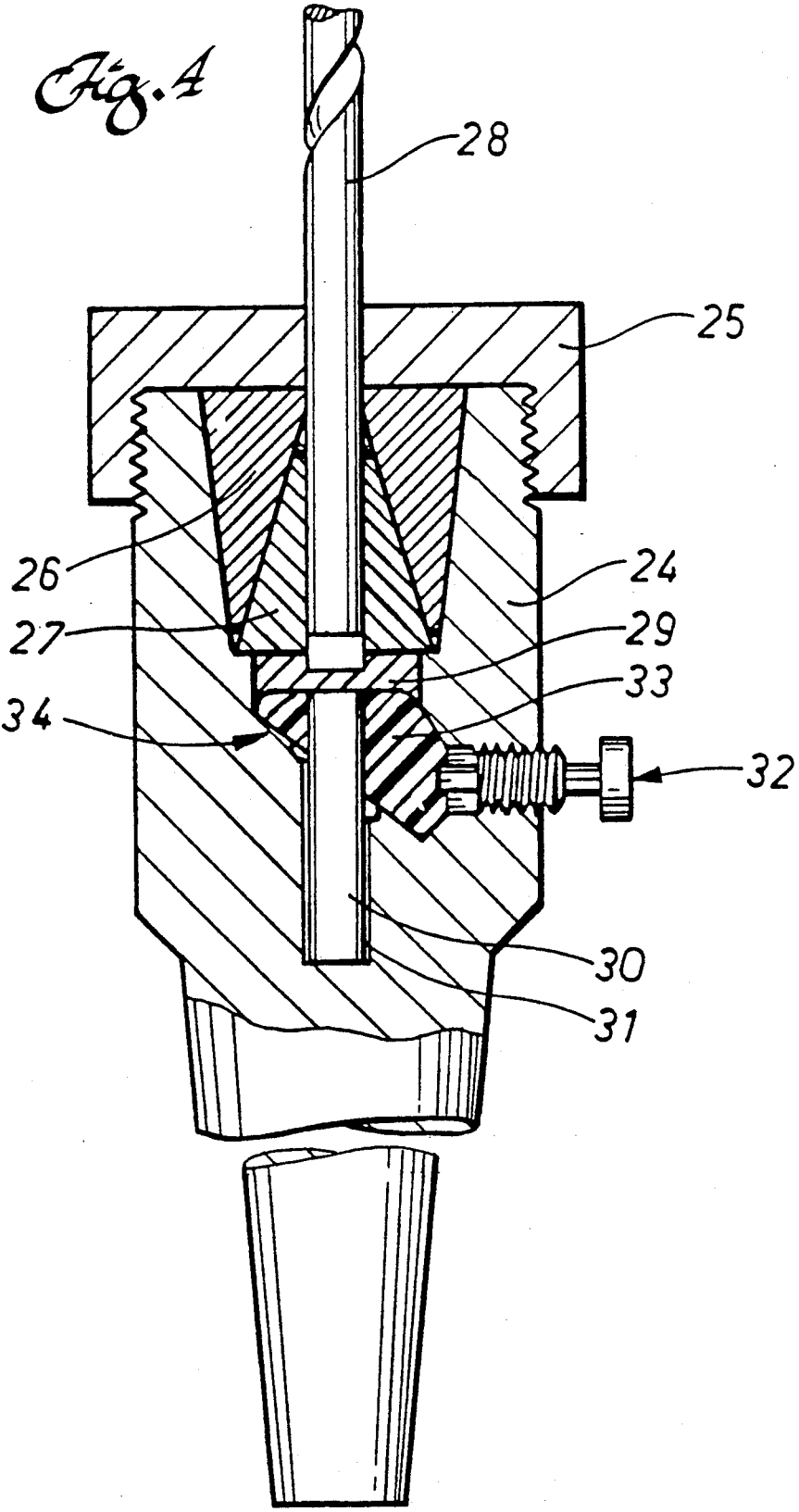
FIGS. 4-6b illustrate a few further embodiments of the invention, particularly intended for clamping axially-shaped pieces.

In the embodiment of FIG. 4, a cylindrical body section 24 is provided with elastomer space 34 with elastomer 33 cast in situ therein. On top of elastomer space 34 is mounted a piston member 29 which is preferably provided with a control rod 30 travelling in a guide way 31 formed in body 24. On top of piston 29 is mounted a clamping sleeve 27, which is shaped as a circular cone and which is tapered away from piston member 29. On top of conical sleeve 27 is fitted another conical sleeve 26 having an inner surface which essentially matches that of conical sleeve 27 while its outer surface expands preferably away from piston member 29. Body section 24 is further fitted with a lid member 25, preferably by means of a a screw joint, said lid being provided with a suitable opening for a tool, e.g. a drill bit, to be fastened. Elastomer 33 is pressurized with a pressure medium 32 which is preferably a screw-driven or eccentric-driven piston.

Figure 5A:
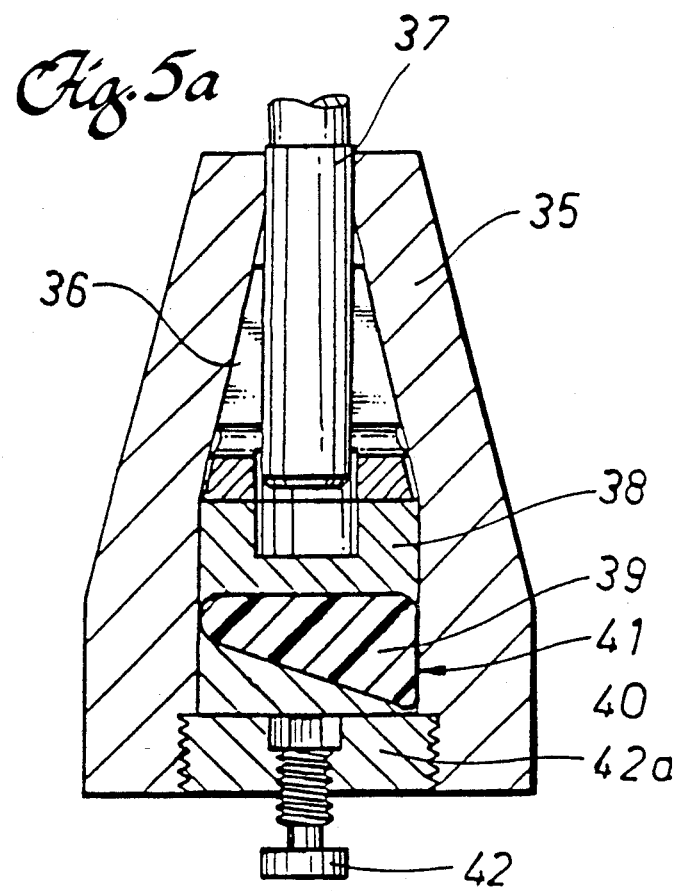
Figure 5B:
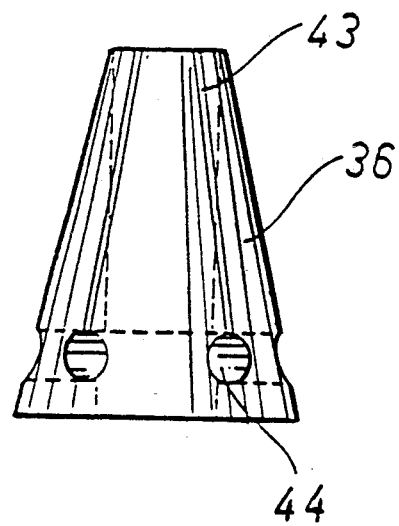

The embodiment of FIG. 5a corresponds essentially to that of FIG. 4 but there is only used one clamping or fastening cone 36. Thus, a body section 35 is provided with a suitable space for a conical sleeve 36. The body section is also provided with a space for a piston member 38, which is mounted below said conical sleeve 36. Below said piston member 38 there is in turn an elastomer space 41 with elastomer 39 cast in situ therein. In the embodiment shown in FIG. 5a, elastomer 39 is pressurized by means of a pressure medium 42 which operates a wedge-shaped piston member 40 for a uniform pressure development in elastomer 39. FIG. 5b shows one preferred design for conical sleeve 36. According to FIG. 5b, said conical sleeve 36 is provided with grooves 43 penetrating through the sleeve wall and terminating in a hole 44. This design makes it possible to bring a conical sleeve 36 readily in contact with a piece 37 to be fastened. In addition, sleeve 36 can be slit in longitudinal direction into two or more sections for facilitating its installation. The conical sleeves 26 and 27 shown in FIG. 4 can also be similar to sleeve 36.

Figure 6A:
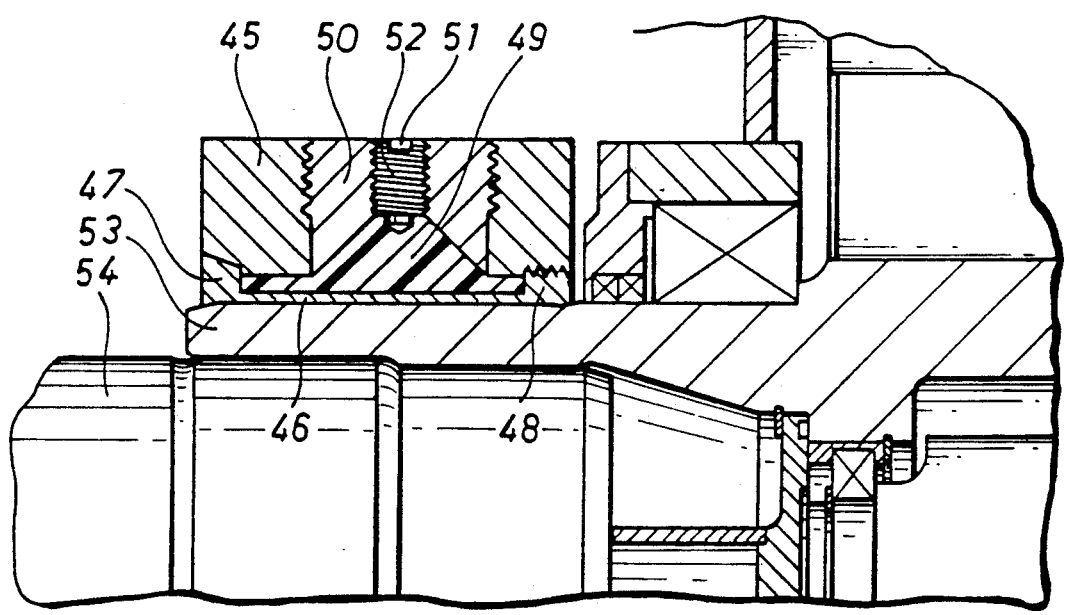
Figure 6B:
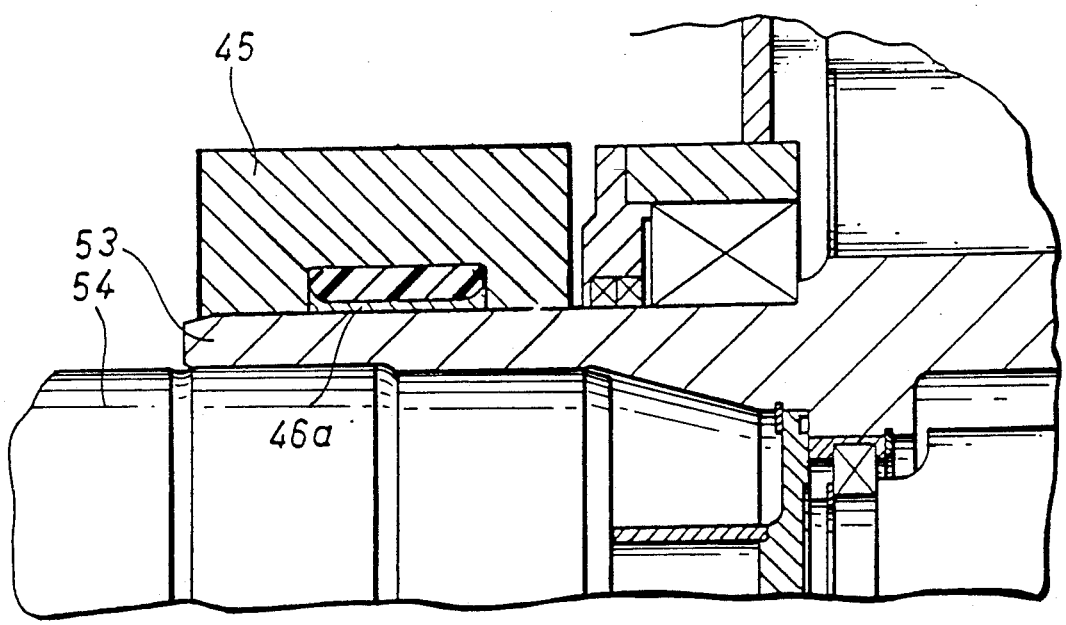

In the embodiment of FIG. 6a, a spacer block 53 is fitted between the sleeve member 46 of a fastening device and the axial piece 54 to be fastened. The clamping sleeve 46 is fastened with a threaded joint 48 and by means of a cone member 47 to body section 45. Body section 45 is also provided with at least one pressurizing medium, said pressurizing medium comprising a sleeve member 50, which is fastened with a threaded joint to body section 45 and inside which is fitted a piston member 52, preferably by means of a threaded joint. Piston member 52 can be operated e.g. by means of a working tool to be set in a recess 51 formed in the outer surface of piston member 52. FIG. 6b shows a modification of the embodiment of FIG. 6a, wherein a clamping sleeve 46a differs in its design from sleeve 46 shown in the embodiment of FIG. 6a. The clamping means could be designed e.g. in a manner that the end portions 47, 48 are replaced with cone members (wedge members) which are displaced by elastomer 49. In FIG. 6b, a piston (not shown) is preferably positioned longitudinally of the passage (perpendicularly to the plane of paper) to provide for a sufficiently long piston displacement.

Figure 7:
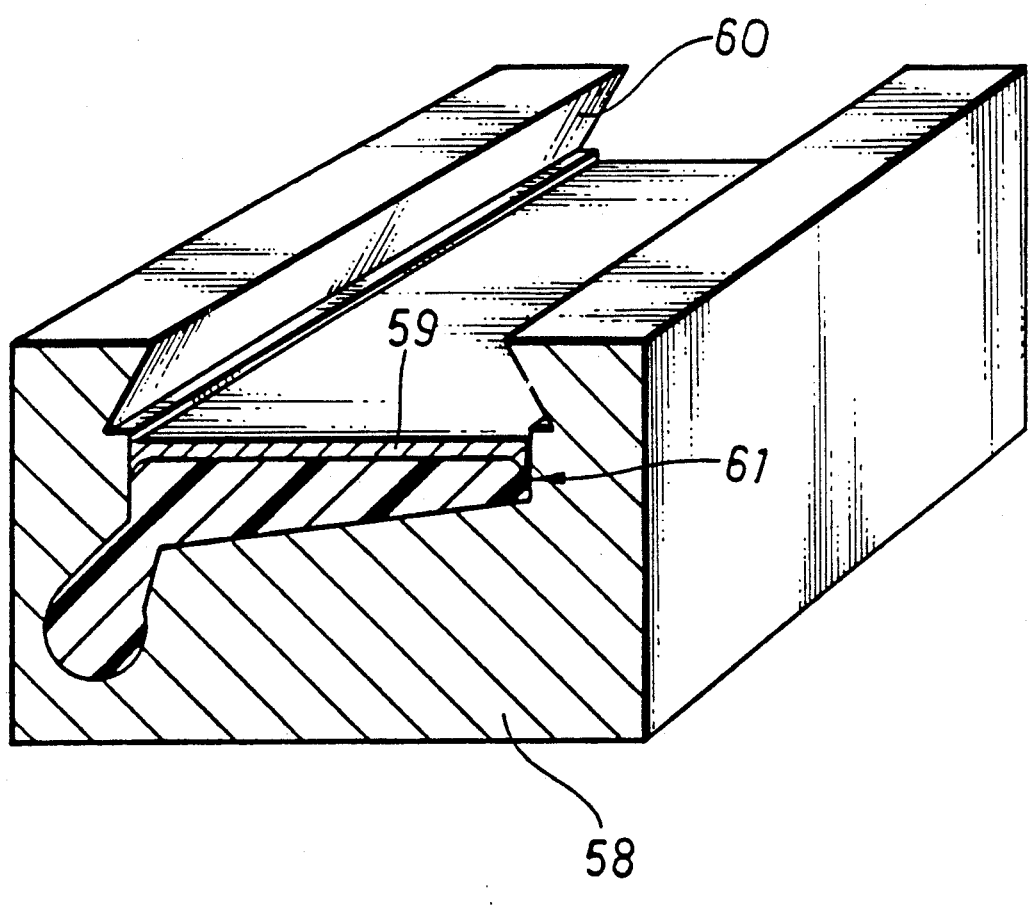
FIGS. 7 and 8 illustrate embodiments for a fastening device of the invention, particularly intended for pieces provided with flat clamping surface.

FIG. 7 illustrates the use of a fastening device of the invention for fixing flat pieces. A body section 58 is provided with an elastomer space 61, on top of which is provided a clamping means 59, preferably a plate-like design, having its edges provided with lip portions for preventing elastomer from passing into the space between the edges of clamping means 59 and body section 58. Above said clamping means 59 is formed a guideway 60 for placing therein a piece to be fastened. Pressurization of the elastomer placed in elastomer space 61 can be effected e.g. by means of a pressurizing medium shown in FIGS. 3a-3c.

Figure 8:
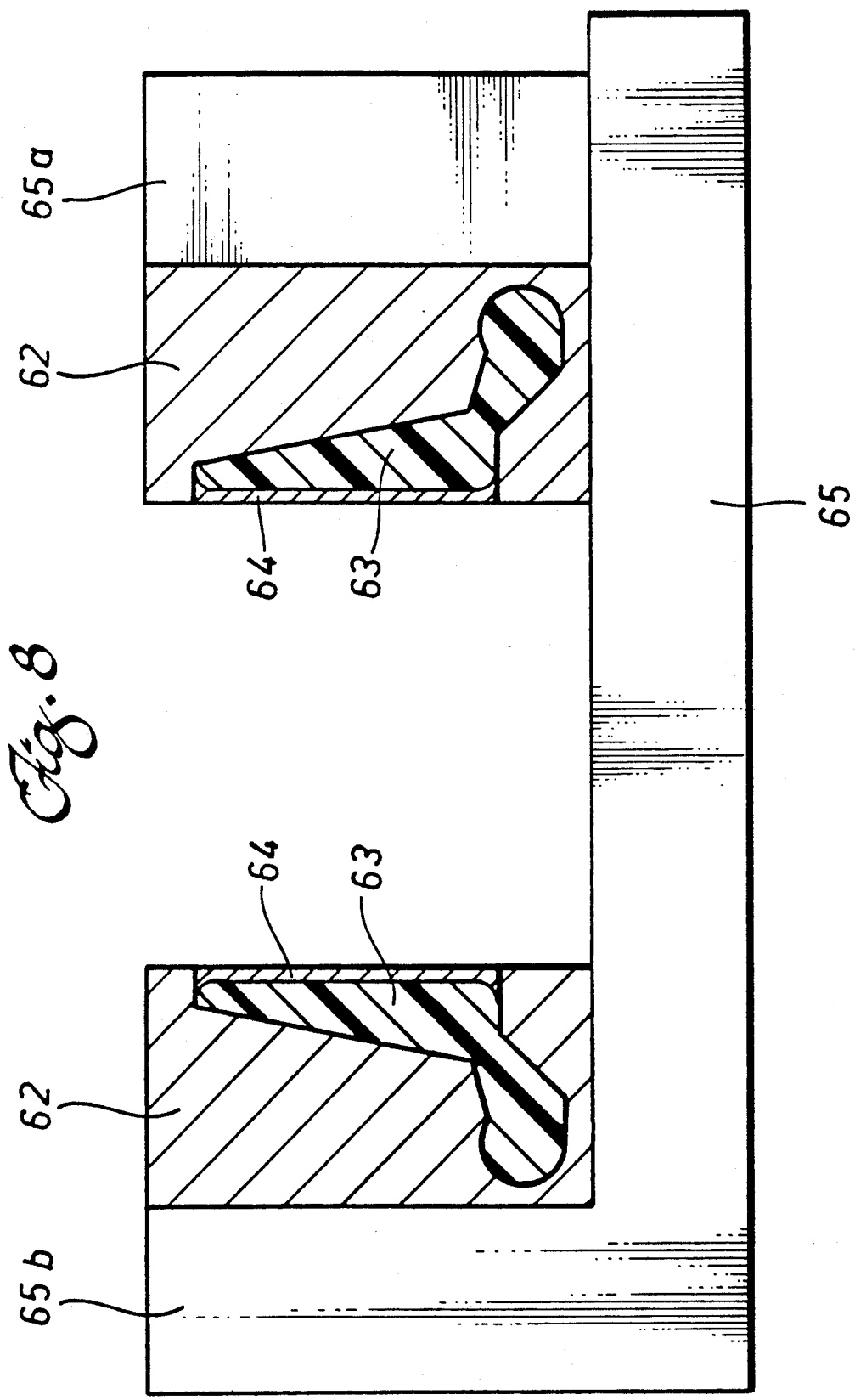

FIG. 8 illustrates the use of a fastening device of the invention as a vise clamp or the like. A body section 62 is provided with an elastomer space for casting elastomer 63 in situ. On top of the elastomer space is mounted a clamping means 64, e.g. similar to what is shown in FIG. 7. The thus obtained fastening devices are placed opposite to each other in a suitable frame 65, one jaw 65a of said frame being adapted to be moved towards the other jaw 65b e.g. by means of a piston array as shown in FIG. 3c. Thus, the movable jaw can be used for effecting the positioning and initial clamping of a piece to be fastened and the final fastening can be effected by pressurizing elastomer layer 63 e.g. by using a pressurizing medium as shown in FIGS. 3a–3c.

Figure 9:
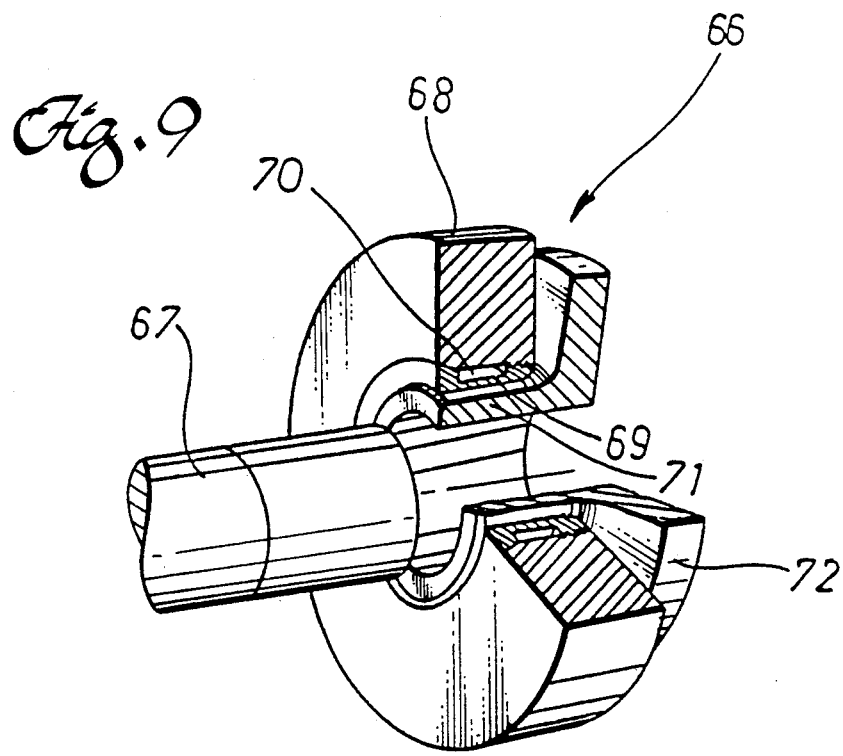
FIGS. 9-12 illustrate a few applications for a fastening device of the invention.

FIG. 9 illustrates the use of a fastening device of the invention as an axle coupling. As shown in the figure, a body section 68 is provided with a sleeve member 69, an elastomer passage 70 being built between sleeve member 69 and body section 68. Inside said sleeve member 69 is also fitted a spacer block 71 which is provided with a flange portion 72. The axles 67 (just one axle is shown) to be clamped are placed inside spacer block 71 followed by the pressurization of the elastomer in elastomer passage 70 e.g. by means of a pressurizing medium shown in FIGS. 3a–3c, preferably tangentially placed in body member 68 (not shown). The spacer block 71 can be further provided with projections shown in FIG. 1c or with a friction surface for improved gripping. The embodiment of FIG. 9 can also be designed in a manner that elastomer space 70, together with its clamping means 69, is placed against flange portion 72. In this case, the pressure medium preferably comprises the embodiment shown in FIG. 3d. Hence, the flange portion 72 is preferably provided with a friction surface.

Figure 10:
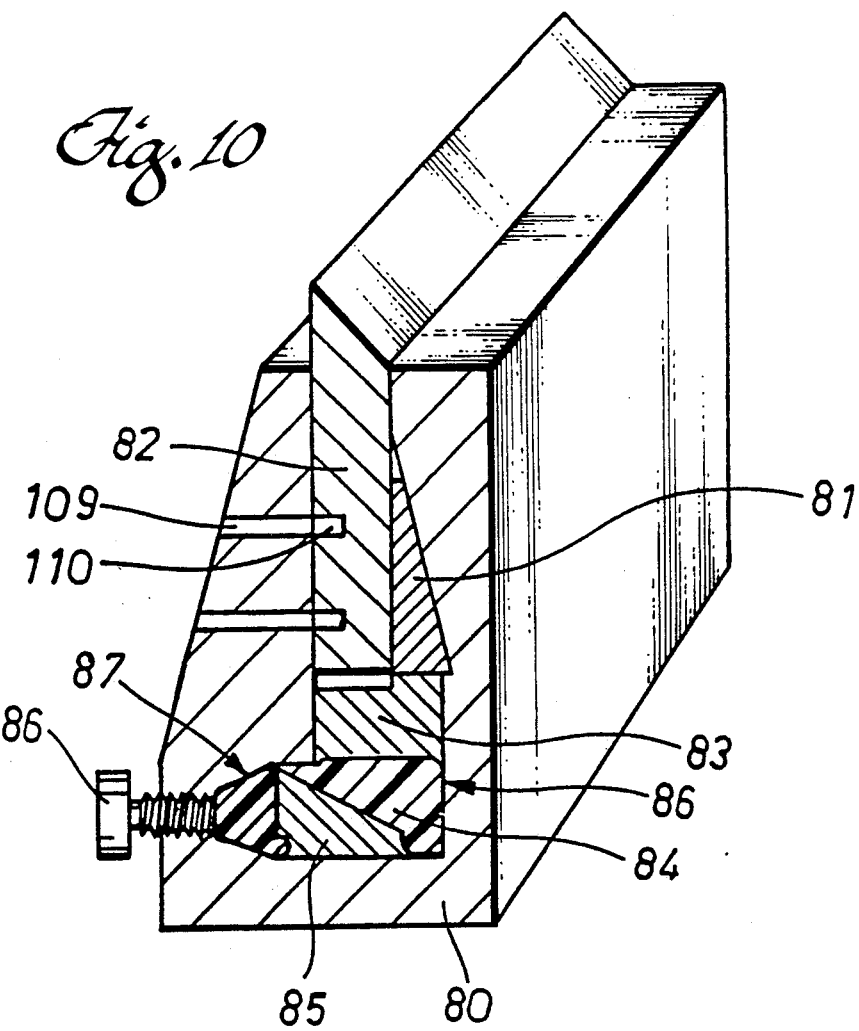

FIG. 10 illustrates the use of a fastening device of the invention as a clamp for a plane blade or a like working tool 82.

In this embodiment, a body section 80 is provided with a pressurizing medium 86 which pushes a wedge member 85 by means of the elastomer placed in an elastomer space 87 creating a uniform pressure on a second elastomer layer 84. The second elastomer layer 84 transfers the pressure forward to a piston 83 which urges a wedge 81 against a tool or blade 82 to be clamped for locking said blade in position. The vertical positioning of blade 82 can be effected e.g. by means of alignment holes 109 made in body 80 and corresponding alignment holes 110 made in blade 82. This can be achieved e.g. by using guide pins or screws. The vertical positioning can also be effected by using a separate clamping element. It is also possible to mount a plurality of tool clamps shown in FIG. 10 on a single body section, the elastomer spaces being preferably connected with each other by means of passages or ducts. The body section can also be a body of revolution, said clamps being provided on its frontal surface.

Figure 11:
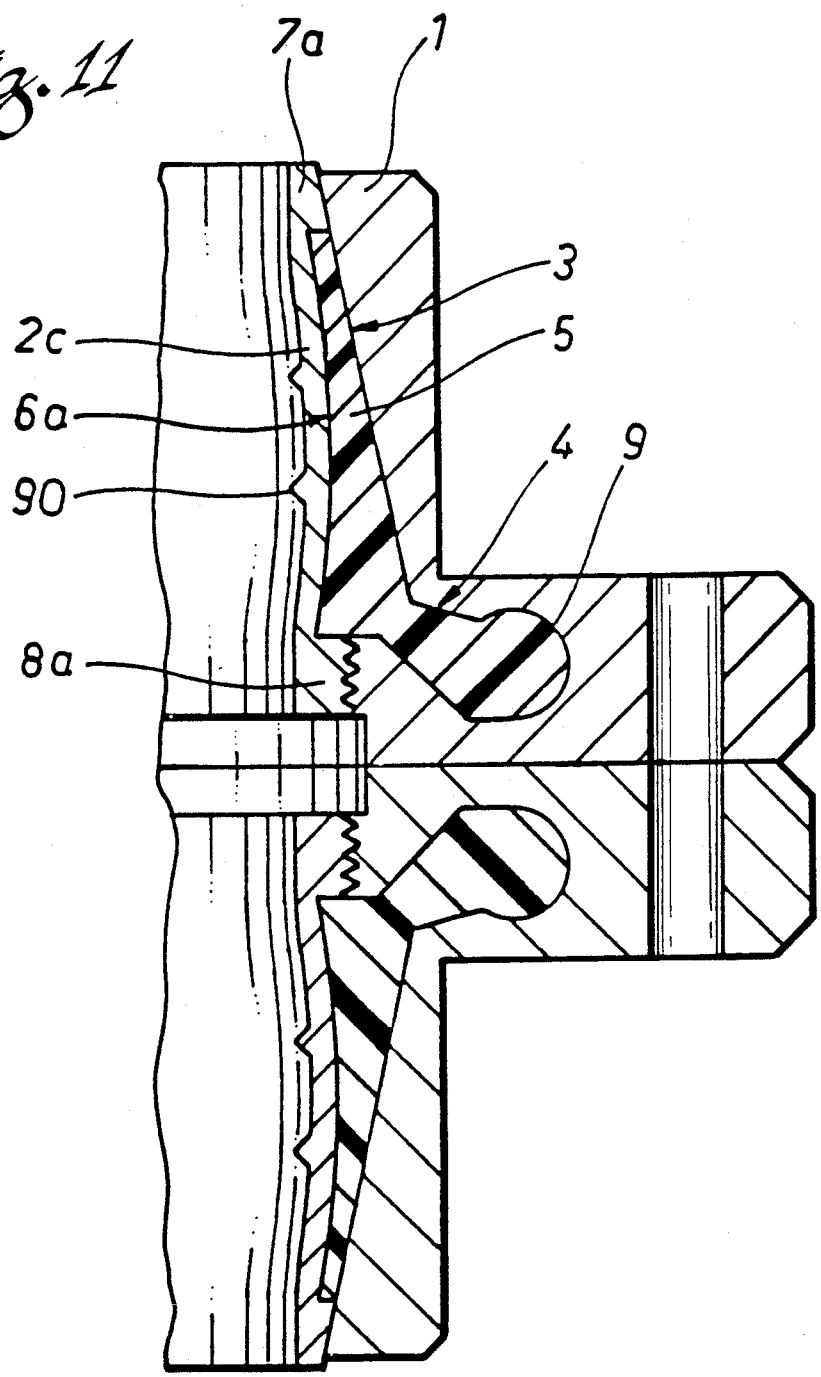

FIG. 11 illustrates the use of a fastening device of the invention as an axle coupling in a manner that e.g. two fastening devices as shown in FIG. 1c are mounted axially in succession and coupled with each other e.g. by means of a screw joint. Naturally, such a coupling can also be designed in a manner that the body section is integral, whereby both elastomer spaces are connected with a common compression chamber. The embodiment of FIG. 11 can also be used for the fastening of axles or shafts of different diameters by means of a suitable spacer block or by designing one of the halves that make up the fastening device in different size.

Figure 12:
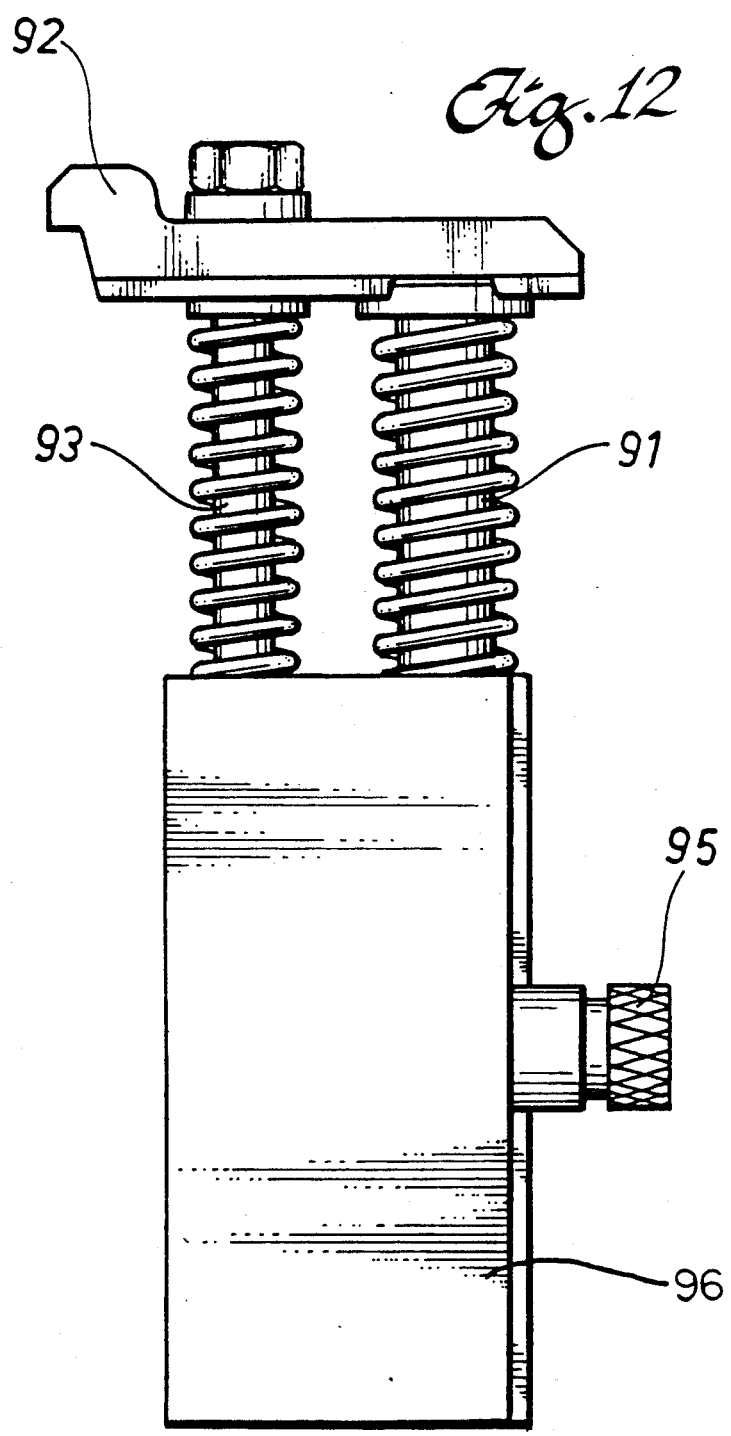

FIG. 12 illustrates an embodiment of a fastening device of the invention, wherein inside a body section 96 is provided an elastomer space as shown e.g. in FIG. 4. A pressurizing medium 95, as shown e.g. in FIGS. 3a–3c, acts on elastomer which displaces "a piston" 91. The end of piston 91 facing away from the body section is fitted with a gripping or clamping means 92 which is further supported on a fixed bracket 93. Piston 91 and support 93 are preferably provided with spring means. When pushing piston 91 outwards from body section 96, the end of gripping means 92 extending over support 93 turns downwards into contact with a piece (not shown) to be fastened for clamping it in position.

The above embodiments are only described as examples of possible designs of a fastening device of the invention and are not intended to limit the scope of protection defined by the claims.

The described elastomer spaces along with their clamping means can of course be positioned other fashions obvious to a skilled person, e.g. on the frontal surface of a cylindrical fastening device body or on one or a plurality of flat surfaces of e.g. a rectangular "rail body" etc. In addition, the pressurizing ducts can be combined, if necessary.

The clamping sleeve can also be designed in many ways, e.g. by bending a sheet-like material into a cylinder, whereby the peripherally directed ends of a finished sleeve are preferably not connected with each other and positioned upon each other in overlapping fashion facilitating the reduction and expansion of the sleeve. The clamping sleeve can also be provided with longitudinal or transverse grooves penetrating through the wall and extending from one end to the proximity of the other end so as to build segments or strips flexible against a piece to be fastened. In this case, the slots or gaps between segments are preferably covered by a plate member/members for preventing elastomer from entering into said gaps.

In addition, a fastening device of the invention can be built directly on a tool or a machine component to be fastened, e.g. on an axle, a V-belt pulley, a cogged wheel etc.

A fastening device of the invention along with its described embodiments and combinations thereof can also be applied e.g. to the cross-feed table of machine tools, to rotary tables etc. This is to utilize their precise positioning and great clamping forces In addition, the illustrated fastening device can be applied as such or with slight modifications also to valves or various sealings without departing from the spirit and scope of protection of the annexed claims.

I claim:

1. An adjustable fastening device for an axially-shaped workpiece, said device comprising:
    a body section; and
    a cylindrical clamping sleeve made of steel mounted in the body section and being adapted for at least partly pressing against a workpiece to be fastened, with a space being defined between walls of the body section and the clamping sleeve, said space having a pressure medium for pressing the clamping sleeve, wherein the pressure medium comprises a room-temperature vulcanizing silicone elastomer compound which is cast in situ in the pressure medium space, having the walls defining the space previously treated with a release agent for preventing the silicone from sticking to the walls and for allowing displacement of silicone in said space, the silicone serving as a hydraulic fluid-replacing pressure medium, whereby, upon the application of pressure on silicone by means of a pressure-creating member, the silicone, by way of its displacement and deformation, transmits pressure to the clamping sleeve which thus presses against the workpiece, and, upon releasing said pressure, the silicone resumes its initial state assisted by the resiliency of the steel clamping sleeve.

2. The fastening device of claim 1, wherein the silicone comprises a silicone rubber base and at least one of a hardener and catalyst for setting at room temperature.

3. The fastening device of claim 1, wherein the pressure-creating member comprises a screw-driven piston provided with a spring means for compensating for temperature differences.

4. The fastening device of claim 3, wherein said screw-driven piston has a silicone-facing end provided with a sealing layer, at least an edge region of said sealing layer being provided with a lip portion.

5. The fastening device of claim 4, wherein said sealing layer is made of TEFLON.

6. The fastening device of claim 4, wherein said sealing layer is made of graphite.

7. The fastening device of claim 1, wherein the pressure-creating member comprises a temperature-controlled heating element wherein thermal expansion of the silicone is used for pressurizing said clamping sleeve.

8. The fastening device of claim 7, wherein said temperature-controlled heating element is further provided with a set screw for equalizing the pressure.

9. The fastening device of claim 1 further comprising a separate compression chamber formed in the body section and means for communicating the separate compression chamber with the space, and for applying the pressure-creating member into said chamber for creating said pressure in said silicone.

10. The fastening device of claim 1, wherein the clamping sleeve has at least one end provided with threads for fastening the sleeve to corresponding threads formed in the body section.

11. An adjustable fastening device for an axially-shaped workpiece, said device comprising:
a body section; and
a cylindrical clamping sleeve made of steel mounted in the body section and adapted for at least partly pressing against a workpiece to be fastened, with a space being defined between walls of the body section and the clamping sleeve, said space having a pressure medium for pressing against the clamping sleeve, wherein the pressure medium comprises a pre-set room-temperature vulcanizing silicone, which is particulate and is pressed through a small hole in the space, whereby the silicone at least substantially does not stick to the walls and allows the displacement of the silicone in said space, the silicone serving as a hydraulic fluid-replacing pressure medium, whereby, upon the application of pressure on the silicone by means of a pressure-creating chamber, the silicone, by way of its displacement and deformation, transmits said pressure to the clamping sleeve which thus passes against the workpiece, and, upon releasing said pressure, the silicone resumes its initial state assisted by the resiliency of the steel sleeve.

12. The fastening device of claim 11, wherein the pressure-creating member comprises a screw-driven piston provided with a spring means for compensating for temperature differences.

13. The fastening device of claim 12, wherein said screw-driven piston has a silicone-facing end provided with a sealing layer, at least an edge region of said sealing layer being provided with a lip portion.

14. The fastening device of claim 13, wherein said sealing layer is made of TEFLON.

15. The fastening device of claim 13, wherein said sealing layer is made of graphite.

16. The fastening device of claim 11, wherein the pressure-creating member comprises a temperature-controlled heating element wherein thermal expansion of the silicone is used for pressurizing said clamping sleeve.

17. The fastening device of claim 16, wherein said temperature-controlled heating element is further provided with a set screw for equalizing the pressure.

18. The fastening device of claim 11 further comprising a separate compression chamber formed in the body section, and means for communicating said space with said chamber, and for applying the pressure-creating member into said chamber for creating said pressure on the silicone.

19. The fastening device of claim 11, wherein the clamping sleeve has at least one end provided with threads for fastening the sleeve to corresponding threads formed in the body section.

20. An adjustable fastening device for clamping of an axially-shaped workpiece, said device comprising:
a body section; and
a cylindrical clamping sleeve made of steel fixed inside the body section and being adapted for at least partly pressing against a workpiece to be fastened, with a space being defined between walls of the body section and the clamping sleeve, said space having a pressure medium for effecting said pressing, wherein said space comprises two sections which are separated by a separating web formed in the space-facing wall of the clamping sleeve and provided with small openings for bringing said sections into communication with each other, the sections having a longitudinal direction and being designed to remain constant in cross section in their longitudinal direction, the body section being further provided with a compression chamber connected with said pressure medium space through a pressure medium passage, wherein the pressure medium comprises a room-temperature vulcanizing silicone elastomer compound which is cast in situ in said pressure medium space, the passage and compression chamber having their walls previously treated with a release agent for preventing the silicone from sticking to the walls and for allowing the displacement of the silicone in said space, passage, and compression chamber, the silicone serving as a hydraulic fluid-replacing pressure medium, whereby, upon the application of pressure on the silicone by means of a pressure-creating member inserted in said compression chamber, the silicone, by way of its displacement and deformation transmits said pressure to the clamping sleeve which thus presses against the workpiece, and, upon releasing said pressure, the silicone resumes its initial state assisted by the resiliency of the steel sleeve.

21. An adjustable fastening device for clamping of an axially-shaped workpiece, said device comprising:
a body section; and
a cylindrical clamping sleeve made of steel fixed inside the body section and being adapted for at least partly pressing against a workpiece to be fastened, with a space being defined between walls of the body section and the clamping sleeve, the space having a pressure medium for effecting said pressing, wherein said pressure medium space comprises two sections which are separated by a separating web formed in the pressure medium space-facing wall of the clamping sleeve and provided with openings for bringing said sections into communication with each other, the sections having a longitudinal direction and being designed to remain constant in cross section in their longitudinal direction, the body section being further provided with a compression chamber connected with said pressure medium space through a pressure medium passage, wherein the pressure medium comprises a room temperature vulcanizing silicone which is pressed as particulate in the pressure medium space, whereby the silicone at least does not substantially stick to the walls and allows the displacement of silicone in said space, passage, and compression chamber, the silicone serving as a hydraulic fluid-replacing pressure medium, whereby, upon the application of pressure on the silicone by means of a pressure-creating member inserted in said compression chamber, the silicone, by way of its displacement and deformation, transmits said pressure to the clamping sleeve which thus presses against the workpiece, and, upon releasing said pressure, the silicone resumes its initial state assisted by the resiliency of the steel sleeve.

* * * * *

UNITED STATES PATENT AND TRADEMARK OFFICE
CERTIFICATE OF CORRECTION

PATENT NO. : 5,174,585
DATED : December 29, 1992
INVENTOR(S) : Erkki Rinne

It is certified that error appears in the above-indentified patent and that said Letters Patent is hereby corrected as shown below:

```
Column 1, line 57, change "direction" to -- directions --.
Column 2, line 62, change "or" to -- of --.
Column 5, lines 49,50, change "250 000" to -- 250,000 --.
Column 5, lines 61,62, change "guide way" to -- guideway --.
Column 6, line 2, after "means of" delete "a"
          (second occurrence).
Column 7, line 62, change "size" to -- sizes --.
Column 8, line 13, after "positioned" insert -- in --.
Column 8, line 41, after "forces" insert a period.
```

In the Claims:

```
Column 9, line 57, change "passes" to -- presses --.
```

Signed and Sealed this

Eighteenth Day of October, 1994

Attest:

BRUCE LEHMAN

*Attesting Officer*          *Commissioner of Patents and Trademarks*